March 18, 1958 — R. GRENINGER — 2,826,958
ADAPTER FOR PROJECTOR
Filed Sept. 16, 1953

INVENTOR
REED GRENINGER
BY *James O. Malone*
ATTORNEY

United States Patent Office 2,826,958
Patented Mar. 18, 1958

2,826,958

ADAPTER FOR PROJECTOR

Reed Greninger, Brooklyn, N. Y., assignor to Viewlex, Inc., a corporation of New York Application September 16, 1953, Serial No. 380,455

1 Claim. (Cl. 88—26)

This invention relates to film projectors and more particularly means for adapting said projectors for projecting images of opaque objects.

These projectors are generally of the type having a light source and adapted to pass said light through a transparent film or slide, and through suitable lenses mounted on the projector onto a viewing screen. The slides are inserted in the projectors between the light source and the lens by suitable slide carriers.

These projectors are limited to projecting transparent films and cannot project images of opaque objects such as stamps, coins, newspaper clippings, written matter, etc. It is frequently desirable to project such opaque objects in schools, libraries, stamp or coin clubs or for general use. Opaque projectors are also useful in inspecting small parts such as screws, gears, etc. A reticle may be superimposed on them for making measurements. Ordinarily transparent film of these objects must be made in order to project them and this is an expensive and lengthy procedure. Therefore, there is a need for a simple adapter for projecting opaque objects with a standard slide projector.

The adapter of the present invention has a barrel-like rear projection which is mounted in the nosepiece of the projector after the projection lens has been removed. The adapter generally comprises a housing, means to receive a slide carrier for inserting an object, a reflector, and an aperture in the front of the housing. The projection lens of the projector is inserted in the front aperture. The slide carrier is tilted with respect to the horizontal and is mounted in the lower front part of the housing substantially in front of the light source. The reflector is mounted at an angle to the slide carrier chosen for no distortion, and substantially behind the front aperture. The slide carrier and lenses may be those of the projector or light source so that the present adapter includes a minimum of extra equipment.

Accordingly, a principal object of the invention is to provide new and improved means for projecting images of opaque objects.

Another object of the invention is to provide an adapter for converting a standard slide projector for projecting images of opaque objects.

Another object of the invention is to provide an adapter for converting transparency projectors for projecting images of opaque objects.

Another object of the invention is to provide an adapter for converting transparency projectors for projecting images of opaque objects comprising a housing having a tailpiece adapted to be connected to projector, means to insert an object in the housing in front of said tailpiece said means being at an angle, a reflector in the box mounted at a proper angle to said object means and an aperture in front of the box substantially in front of said reflector.

These and other objects of the invention will be apparent from the following specification and drawings of which:

Figure 1:
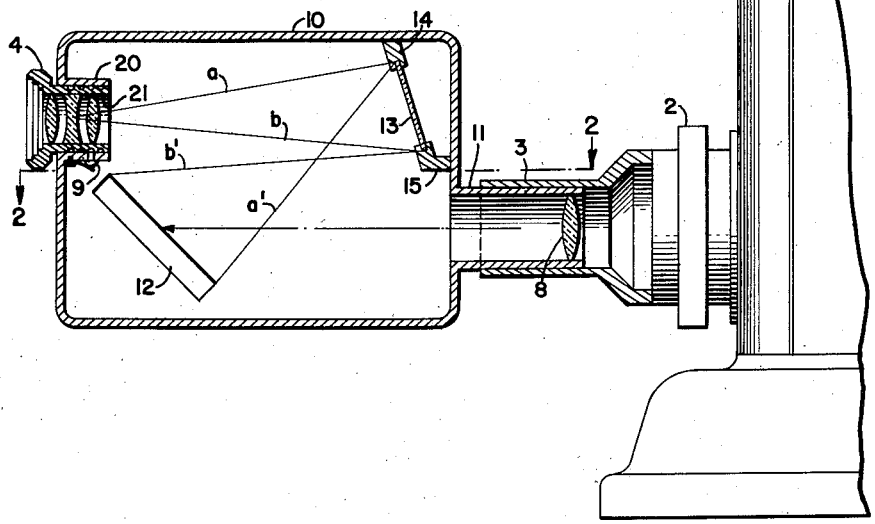
Figure 1 is a view, partially in section, of an embodiment of the invention.
Figure 2:
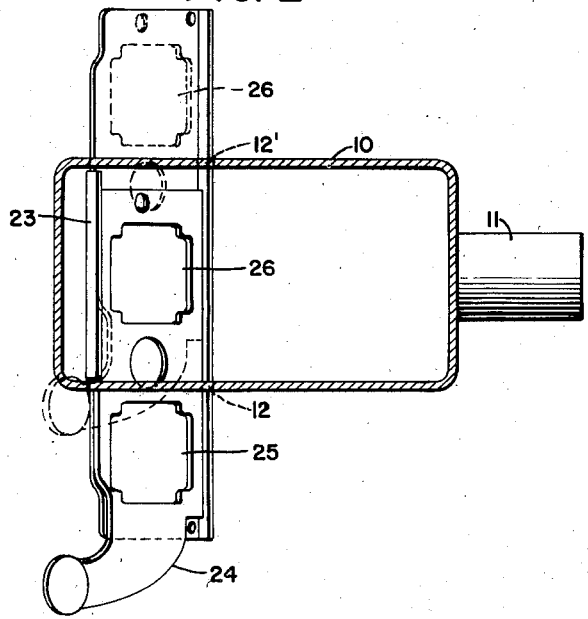
Figure 2 is a partial sectional view of the embodiment of Figure 1.

Referring to Figures 1 and 2 there is shown a conventional slide projector 1 adapted to project images of transparent films which are inserted in the conventional slide carrier receiver 2. The projector has a nosepiece 3 adapted to receive a projection lens which is normally used to focus the image on the screen.

The adapter of the present invention includes a box-like housing 10 having a tailpiece 11 connected to its lower rear portion. A collector lens 8 is attached in the barrel-like tailpiece to restrict the light beam to the object. The tailpiece 11 is adapted to fit snugly inside the nosepiece 3 of the projector. Clamping means will not normally be required but suitable clamping means may be used if desired.

The adapter housing 10 is slotted on the sides to receive a slide carrier in the front lower portion of the housing 10. The aperture slots 12 and 12' are cut at an angle and located substantially in front of the tailpiece 11.

The flat mirror 13 or other suitable front reflector, for instance an aluminumized reflector, or a prism, is mounted at a suitable angle in the upper rear portion of the housing 10. The mirror 13 may be fixedly connected to the housing 10 by means of the brackets 14 and 15. The object holder and reflector 13 are angularly related so that the projected images are in a plane perpendicular to the optical axis of the projection lens 21. In one embodiment the slot 12 was mounted at an angle of 45° to the horizontal, and the reflector 13 at an angle of substantially 66° to the horizontal. Alternatively, the corner of the box could be cut off along the slot and covered with glass, and the opaque object held against the glass with suitagle means.

Referring to Figure 1, the desirable angular relation is such that the distances $a+a'=b+b'$. Various other angles may be used depending on the spacing of the various elements. The mirror is normally not required to be adjustable in angle for most normal uses but may be pivotally adjustable about one end if desired. In the upper front of the housing 10 is a lens holder 20 which is adapted to receive an adjustable lens 21. The lens 21 is located substantially in front of the mirror 13.

The aperture slit 12 is adapted to receive a conventional slide carrier 23 of the type normally used with slide projectors. The carrier 23 is preferably of the type which is slid to one side so that a picture or object may be inserted and then slid so that the picture is in the line of projected light. The other side of the slide carrier then extends out of the other side of the box so that a second picture or object may be inserted. The slide carrier is strictly conventional and as a matter of fact the slide carrier normally used with the projector 1 is intended to be used with the adapter 10. The projection lens 21 is conventional and is the lens normally used in the nosepiece 3 of the projector 1. It is adjustable by means of the spring loaded pin 9 bearing in the barrel thread.

The operation of the system is as follows: the slide carrier 23 is inserted in the slot 12 and an object is inserted in the slide carrier. Therefore the light from the projector 1 will strike the object and will be reflected on to the reflector 13 and thence projected forwardly through the adjustable lens 21 to a suitable screen.

In using the present invention it is convenient to mount the opaque objects to be projected upon mounting cardboards which are similar in size to the normal film slides. Many objects, such as coins or stamps, may be so mounted and used in the projector. The adapter of the present invention is designed primarily for substantially flat objects, such as stamps, coins, newspaper clippings, opaque pictures, snapshots and written messages. However projections may be made of images of objects which are not substantially flat providing that they are not too big to fit into the slide 12. In particular cases if it is desired to project objects which are wider than the slit 12, the slit 12 may be widened without impairing the operation of the invention.

A simple platen with adjustable clamping means may be used instead of a slide carrier. A reticle may be superimposed over the object for making measurements, for instance on screws or gears.

Figure 2 shows a sectional view of the adapter taken along the line 2—2 Figure 1. Figure 2 shows the housing 10, tailpiece 11 and slot aperture 12. A slide carrier 23 is shown mounted in the aperture 12. The slide carrier is strictly conventional and comprises an elongated track member which is mounted in a stationary position in the housing 10 and a sliding member 24 is adapted to slide inside the track member 23. The sliding member is adapted to receive two slides, films, or opaque objects in holders, 25, 26. The holder 26 is shown in a position to be illuminated and its image projected onto the screen. The objects whose images are to be projected are preferably mounted on small mounting cards which are the same size as the slides normally used with slide projectors. When the operator finishes with object 26, he slides the sliding member 24 until the holder 25 is in the field of view and its object will then be outside the housing as shown on the dotted lines and may be removed and a new object inserted. The slide carrier may be any of many which are commercially available and its details are beyond the scope of the present invention. It is illustrated merely to show the operation of the adapter unit in the present invention.

The reflectivity of the objects should be increased as much as possible for maximum light transmission. For instance, if coins are being projected, it is desirable to shine them, or if snapshots are being used, it is desirable to use those with a glossy finish.

Various modifications of the invention will be apparent to those desiring to practice it. The invention may be operated with the housing 10 inverted so that the projection lens 21 is below the tailpiece 11. This modification may be desirable to keep the total weight of the equipment at the lowest position to prevent any possibility of the tailpiece 11 turning inside the nosepiece 3 of the projector 1.

The adapter of the present invention may be used with projectors of all sizes, for instance those that project 8, 16 or 35 mm. film. It may be used with strip film projectors or stereoprojectors or even with enlargers since the only requirement of the projector in this case is that it provide a suitable source of light. Of course modifications in the mounting means between the light source and the adapter would have to be suitably made. Also, the focal length of the lenses of the projector would not make any difference to the use of the present adapter since modifications, if any, necessary could be made in the adapter with the exercise of straightforward engineering and without departing from the scope of the present invention.

I claim:

An adapter for converting a transparency projector for the projection of images of opaque objects comprising a closed light-proof housing having substantially parallel front and back walls, substantially parallel top and bottom walls, and substantially parallel side walls, a tubular tailpiece adjacent the bottom of the back wall and extending outwardly therefrom along an axis substantially parallel to the longitudinal axis of the housing, said tailpiece being dimensioned to be slidably received in the projection-lens receiving nosepiece of said projector with the projection lens removed and to pass light rays from the projector into the housing, a collector lens fitted in said tailpiece, a tubular projection lens holder in the front wall of said adapter housing adjacent the upper edge thereof and having an axis generally parallel to the longitudinal axis of the housing said holder being dimensioned to receive the projection lens of the projector, said side walls of the housing being formed near the bottom thereof with aligned slots each inclined to the horizontal at an angle of approximately 45°, an object-supporting carrier received in said slots to extend across the width of the housing, object-supporting means slidably received in said carrier and including at least two laterally-spaced object-supporting sections any one of which extends externally of the housing when the other is disposed within the housing, whereby opaque objects to be projected can be carried into the housing in the path of the light rays which pass from the projector through said tailpiece, a pair of reflector-supporting members mounted respectively on the top and back walls of the housing, said supporting members being disposed in a plane forming an angle of substantially 66° to the horizontal, and a reflector mounted in said supporting members and disposed in said plane, said reflector thereby being positioned to receive light rays reflected from opaque objects on said carrier to the projection lens received in said holder.

References Cited in the file of this patent

UNITED STATES PATENTS

| | | |
|---|---|---|
| 864,418 | Goodrich | Aug. 27, 1907 |
| 957,899 | Patterson | May 17, 1910 |
| 1,114,730 | Butcher | Oct. 27, 1914 |
| 1,616,747 | Harnett | Feb. 8, 1927 |
| 1,902,907 | Semenitz | Mar. 28, 1933 |
| 2,273,936 | Ceroni | Feb. 24, 1942 |
| 2,395,975 | Schwanhausser | Mar. 5, 1946 |
| 2,452,745 | Getter | Nov. 2, 1948 |
| 2,611,293 | Weiss | Sept. 23, 1952 |
| 2,612,818 | Jackson | Oct. 7, 1952 |